United States Patent
Tanaka

(10) Patent No.: US 11,476,534 B2
(45) Date of Patent: Oct. 18, 2022

(54) ELECTRONIC DEVICE INCLUDING BATTERY AND BATTERY COMPARTMENT

(71) Applicant: Panasonic Intellectual Property Management Co., Ltd., Osaka (JP)

(72) Inventor: Shintaro Tanaka, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 282 days.

(21) Appl. No.: 15/463,618

(22) Filed: Mar. 20, 2017

(65) Prior Publication Data

US 2017/0194608 A1   Jul. 6, 2017

Related U.S. Application Data

(63) Continuation of application No. PCT/JP2015/004787, filed on Sep. 18, 2015.

(30) Foreign Application Priority Data

Sep. 29, 2014   (JP) .............................. JP2014-198974

(51) Int. Cl.
*H01M 50/209* (2021.01)

(52) U.S. Cl.
CPC ...... *H01M 50/209* (2021.01); *H01M 2220/30* (2013.01)

(58) Field of Classification Search
CPC ............. H01M 2/1061; H01M 2/1022; H01M 2/1016; H01M 2/10; H01M 2220/30; H01M 2/1066; H05K 7/183; H05K 7/18; H05K 7/16; H05K 7/00; H05K 5/00; H05K 5/0086; G06F 1/1658; G06F 1/1635

See application file for complete search history.

(56) References Cited

U.S. PATENT DOCUMENTS

2011/0076523 A1 * 3/2011 Iwamoto ............. H01M 2/1066
   429/8
2011/0205713 A1   8/2011 Kawada et al.

FOREIGN PATENT DOCUMENTS

| JP | 2538218 Y2 | 6/1997 | |
| JP | 2001-266826 | * 9/2001 | ............. H01M 2/10 |
| JP | 2011-071002 | 4/2011 | |
| JP | 2011-175462 | 9/2011 | |
| JP | 2012028921 | * 2/2012 | ............. B60R 25/01 |

OTHER PUBLICATIONS

English Translation of JP 2012028921.*
English Translation of JP2001-266826.*
International Search Report of PCT application No. PCT/JP2015/004787 dated Dec. 15, 2015.

* cited by examiner

*Primary Examiner* — Kiran Quraishi Akhtar
(74) *Attorney, Agent, or Firm* — Hamre, Schumann, Mueller & Larson, P.C.

(57) ABSTRACT

An electronic device includes a battery and a housing whose battery compartment has a main surface and a pair of side surfaces. The main surface is configured to face the bottom surface of the battery and the side surfaces are configured to face the respective side surfaces of the battery. Each of the side surfaces has a guide rail for the battery. Each of the guide rails has a first end at a primary end of the housing and a second end. Each of the guide rails is inclined such that the distance between the first end of the guide rail and the main surface of the battery compartment is greater than the distance at the second end.

7 Claims, 11 Drawing Sheets

ELECTRONIC DEVICE INCLUDING BATTERY AND BATTERY COMPARTMENT

BACKGROUND

1. Technical Field

The present disclosure is related to an electronic device including a battery and a battery compartment for the battery.

2. Description of the Related Art

Unexamined Japanese Patent Publication No. 2011-175462 discloses an electronic device including a battery compartment into which a battery can be slid for installation.

SUMMARY

An electronic device of the present disclosure includes a battery and a housing having a battery compartment for the battery. The battery has a main surface and a pair of side surfaces perpendicular to the main surface. The battery compartment is a recess in a main surface of the housing. The recess is formed by cutting away the area including a primary end of the housing. The battery compartment has a main surface and a pair of side surfaces. The main surface and side surfaces of the battery compartment are configured to be face the main surface and side surfaces of the battery, respectively, when the battery is placed in the battery compartment. Each of the side surfaces of the battery compartment has a guide rail for guiding the battery into the battery compartment. Each of the side surfaces of the battery has a guide groove for engaging with a corresponding guide rail. Each of the guide rails has a first end at the primary end of the housing and a second end at an opposite end of the primary end of the housing. Each of the guide rails is inclined with respect to the main surface of the battery compartment from the first end to the second end. A distance between the first end of each guide rail and the main surface of the battery compartment is greater than a distance between the second end of the guide rail and the main surface of the battery compartment.

In the electronic device of the present disclosure, each of the guide rails is inclined with respect to the main surface of the battery compartment such that the distance between the guide rail and the main surface of the battery compartment decreases from the front end of the guide rail (the first end of the guide rail at the primary end of the housing) to the rear end of the guide rail (the second end of the guide rail at the opposite end of the primary end of the housing) in the direction of battery insertion. When the battery is inserted into the battery compartment, this structure allows the battery to keep a certain distance from the battery compartment at the beginning of the insertion, which prevents the battery from coming into contact with the housing of the electronic device during the insertion of the battery into the battery compartment. This prevents the main surface of the battery (the surface to face the main surface of the battery compartment) from being damaged.

DETAILED DESCRIPTION

An exemplary embodiment of the present disclosure will be described in detail below with reference to the accompanying drawings. To avoid redundant description and make the present disclosure easily understood by those skilled in the art, the following description does not include unnecessarily detailed description such as the description on known facts or the description on the structures that are substantially the same as the structures already described.

It should be noted that the accompanying drawings and the following description are provided for the purpose of making the present disclosure fully understood by those skilled in the art and are not intended to limit the scope of the claims in any way.

Problems to be Solved by the Present Disclosure

When a removable battery is slid into a battery compartment of an electronic device, a surface of the battery may be damaged due to the contact of the battery with the battery compartment of the electronic device. To solve this problem, it has been proposed to widen the gap between the battery and the battery compartment. If the gap is made wider, however, the electronic device will be thicker accordingly, which degrades the design of the device and increases the weight of the device. Another approach to preventing the battery from being damaged is to flatten the battery compartment. Such a flattened battery compartment, however, cannot accommodate a reinforcing member such as a reinforcing rib for sufficiently ensuring the strength of the electronic device.

In consideration of the above problems, the present exemplary embodiment provides an electronic device that prevents a battery surface from being damaged at the time of battery insertion without thickening the electronic device (first housing 2 described later). According to the present exemplary embodiment, the electronic device can also accommodate a reinforcing member such as a reinforcing rib in the battery compartment for sufficiently ensuring the strength of the electronic device. First exemplary embodiment will now be described with reference to the accompanying drawings.

First Exemplary Embodiment

[1. Structure]
[1-1. Overall Structure]

Figure 1:
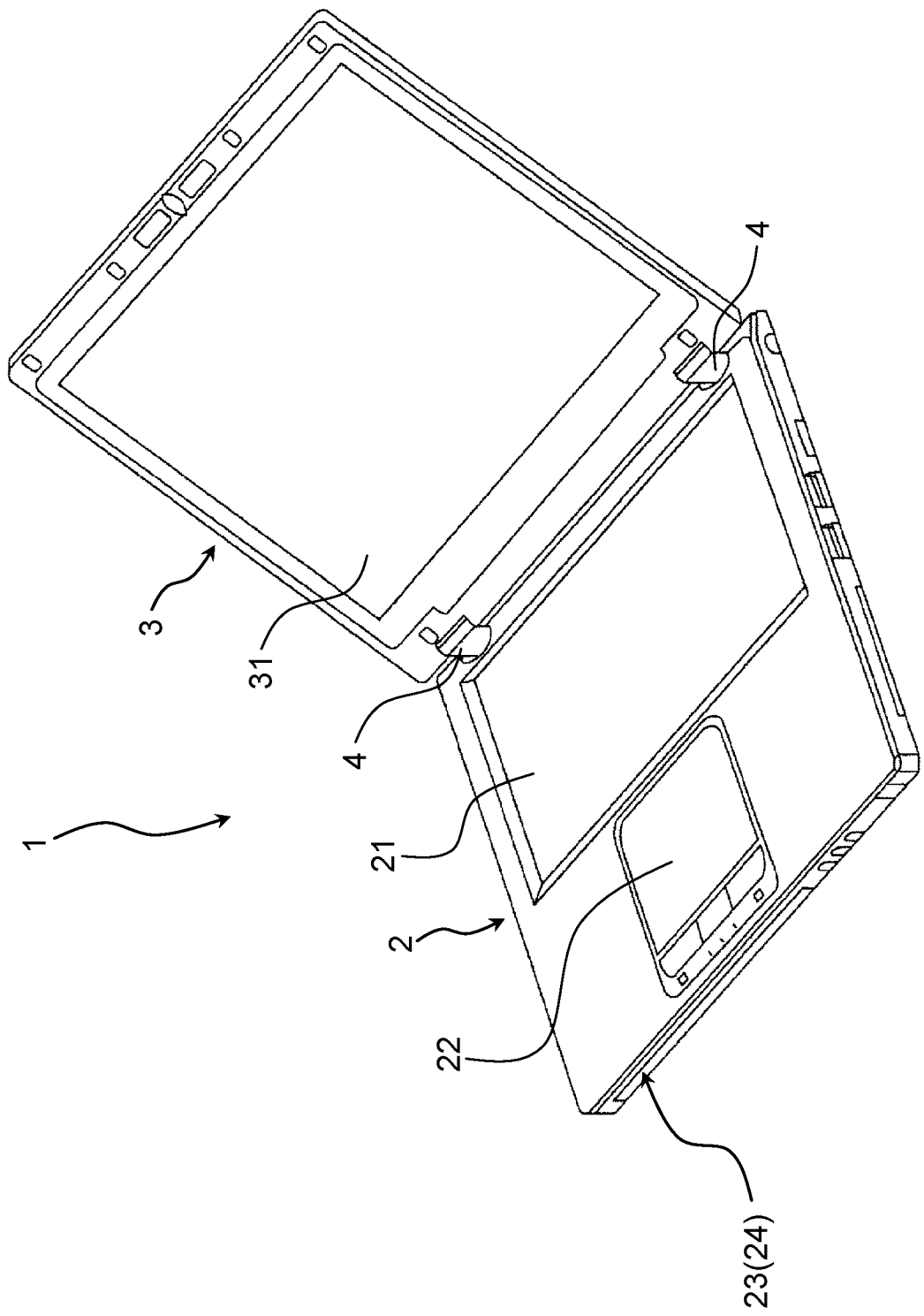
FIG. 1 is a perspective view of a personal computer of the present disclosure.

FIG. 1 is a perspective view of personal computer 1 which is an example of an electronic device of the present disclosure. As illustrated in FIG. 1, personal computer 1 of FIG. 1 includes first housing 2, second housing 3, and hinge 4. Second housing 3 is openably coupled to first housing 2 with hinge 4. In this exemplary embodiment, personal computer 1 has the front side close to a user which uses personal computer 1 and the rear side (hinge 4 side) far from the user.

First housing 2 includes input devices such as keyboard 21 and pointing device 22 on a surface. First housing 2 includes battery compartment 24 in the bottom surface and battery compartment 24 is accommodating removable battery 23.

Second housing 3 includes a display device such as a liquid crystal display (LCD) 31 on a surface.

Personal computer 1 is powered by battery 23 in battery compartment 24. First housing 2 and battery 23 have battery guide mechanisms for guiding battery 23 into or out of battery compartment 24. The battery guide mechanisms will now be described.

[1-2. Structures of Battery Guide Mechanisms]
[1-2-1. Battery Guide Mechanism of Battery Compartment]

Figure 2:
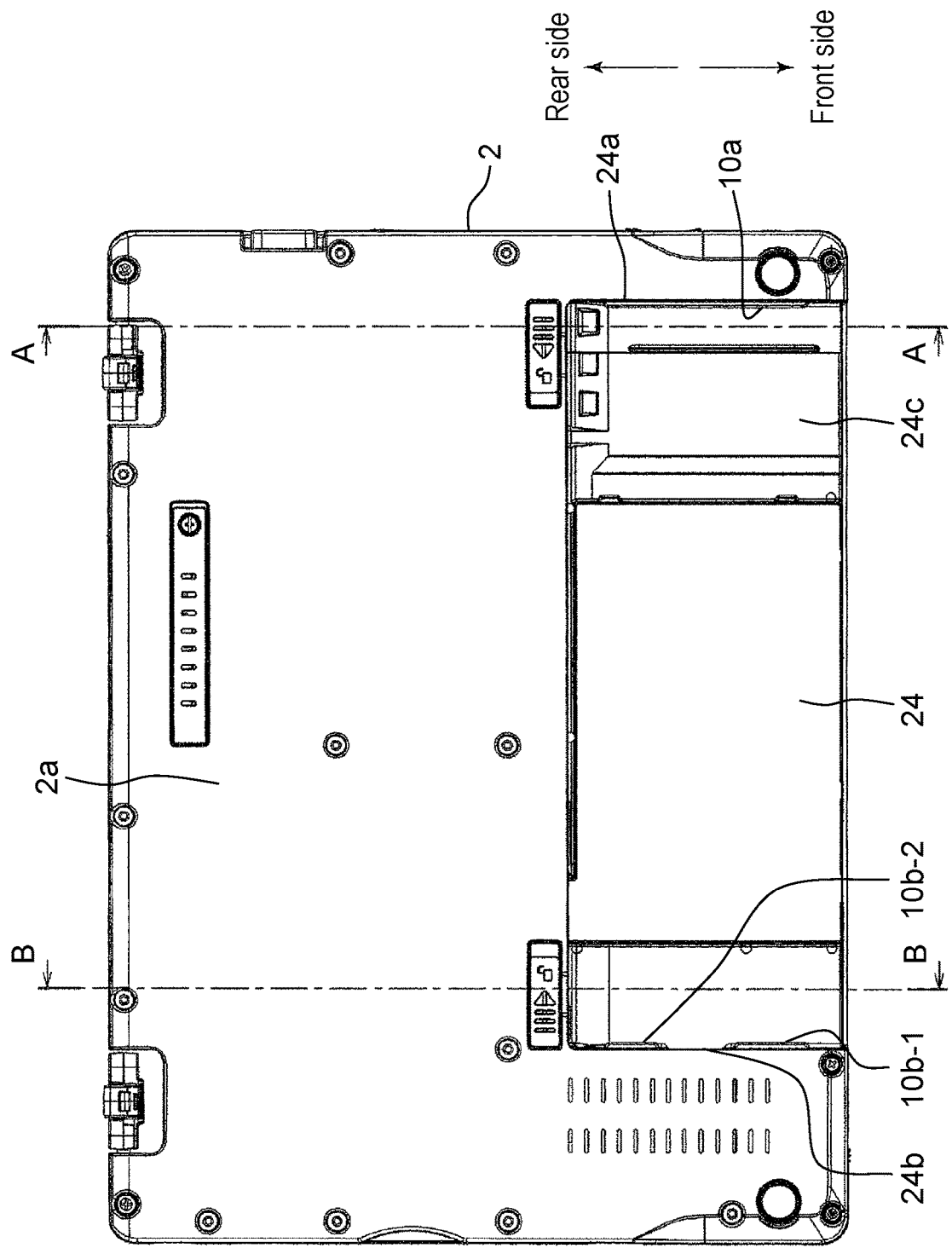
FIG. 2 is a plan view of the personal computer of FIG. 1 (without a battery).

FIG. 2 is a plan view of personal computer 1 of FIG. 1 without battery 23 when viewed from bottom surface 2a. As illustrated in FIG. 2, battery compartment 24 is a recess in bottom surface (first main surface) 2a of first housing 2, bottom surface 2a being perpendicular to the thickness direction of first housing 2. The recess is formed by cutting away the area including a front end (primary end) of first housing 2. Battery compartment 24 has a shape corresponding to the shape of battery 23. Battery compartment 24 has main surface 24c and a pair of side surfaces 24a and 24b. Main surface 24c is configured to face bottom surface (main surface) 23d of battery 23 (see FIG. 8), which is configured to face battery compartment 24, and side surfaces 24a and 24b are configured to face side surfaces 23a and 23b of battery 23 (see FIG. 7), respectively. Side surface 24a of battery compartment 24 has guide rail 10a, and side surface 24b of battery compartment 24 has guide rails 10b-1 and 10b-2, guide rails 10a, 10b-1, and 10b-2 being guide parts for guiding battery 23 into battery compartment 24. Guide rail 10a and guide rails 10b-1 and 10b-2 extend from the front end to the rear end of battery compartment 24.

Figure 3:
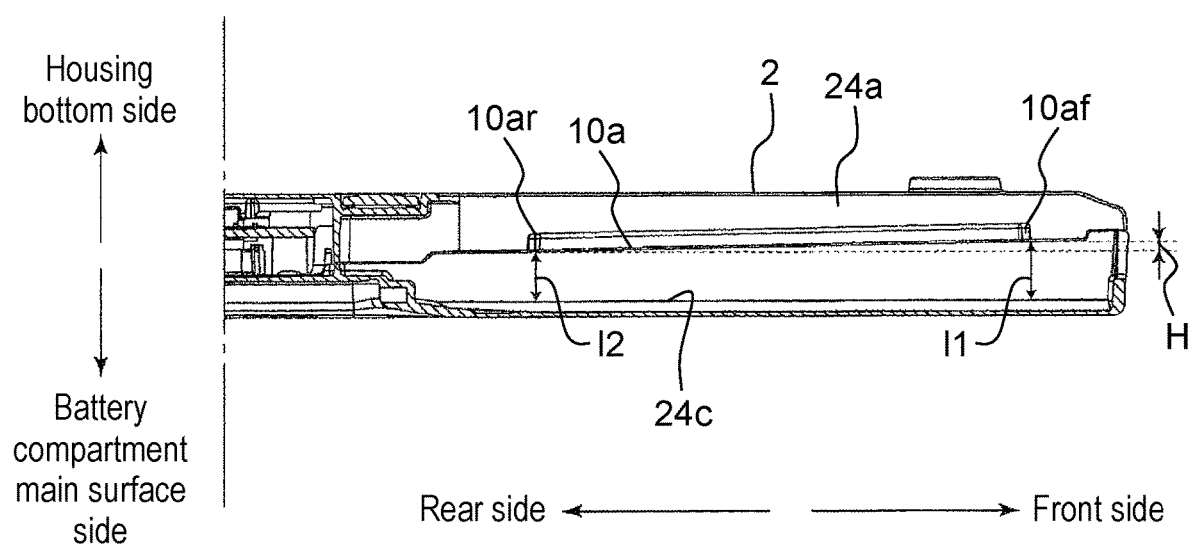
FIG. 3 is a vertical cross-sectional view of a battery compartment taken along line A-A of FIG. 2.
Figure 4:
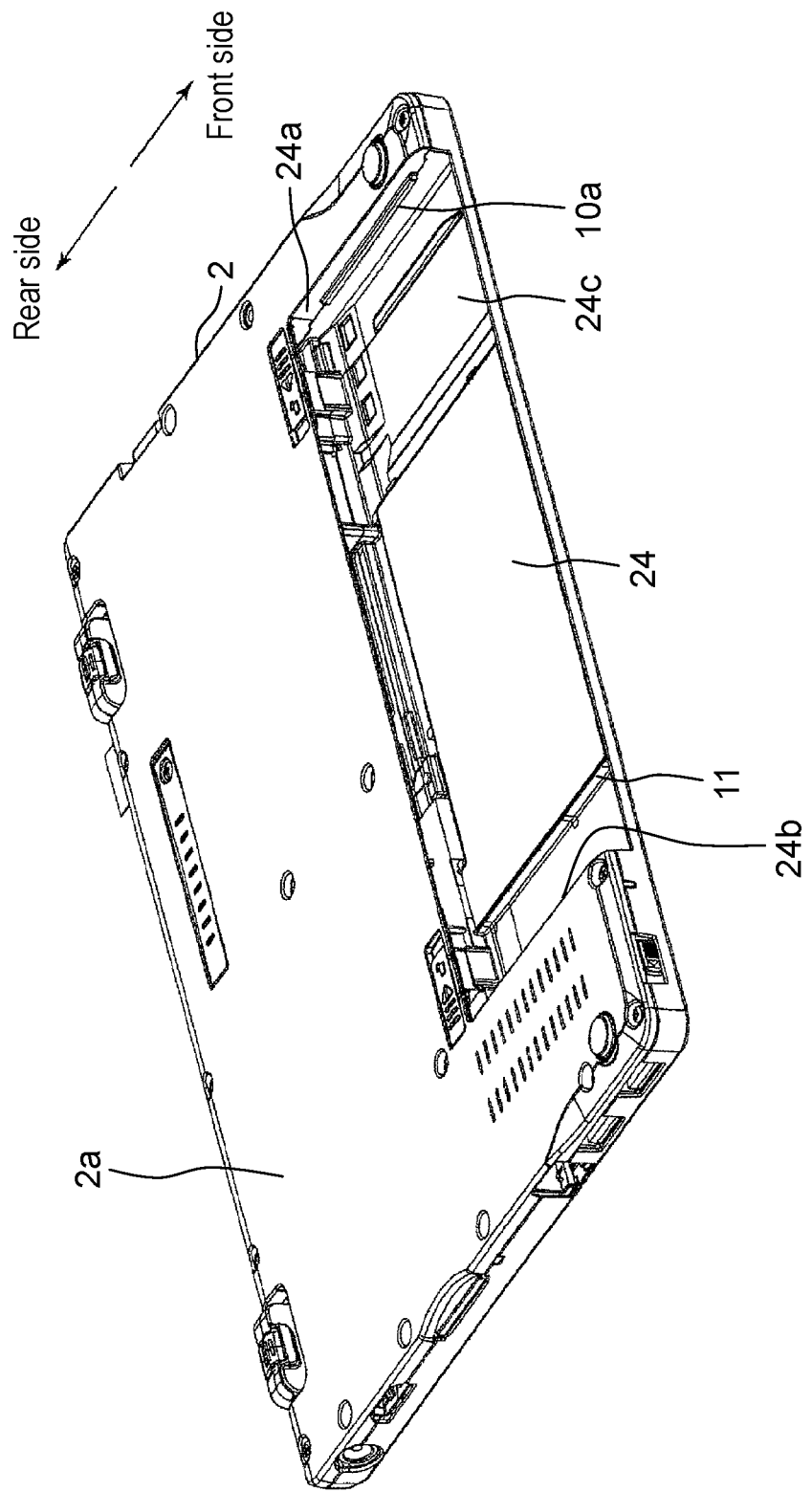
FIG. 4 is a perspective view of the personal computer of FIG. 1 (without a battery).

FIG. 3 is a vertical cross-sectional view of battery compartment 24 taken along line A-A of FIG. 2. FIG. 4 is a perspective view of personal computer 1 of FIG. 1 without battery 23 when viewed from bottom surface 2a. As illustrated in FIGS. 3 and 4, guide rail 10a is inclined with respect to main surface 24c of battery compartment 24 such that distance 11 between front end 10af of guide rail 10a (the first end of the guide rail at the primary end (front end) of first housing 2) and main surface 24c of battery compartment 24 is greater than distance 12 between rear end 10ar of guide rail 10a (the second end of the guide rail at the opposite end of the primary end of first housing 2) and main surface 24c of battery compartment 24. Guide rail 10a is inclined with respect to main surface 24c of battery compartment 24. In detail, front end 10af of guide rail 10a in the direction of the insertion of battery 23 is at a higher position than rear end 10ar of guide rail 10a in the direction of the insertion of battery 23 by H with respect to main surface 24c of battery compartment 24. H is approximately 1 mm, for example. As illustrated in FIG. 4, battery compartment 24 accommodates a reinforcing member such as reinforcing rib 11 on main surface 24c for sufficiently ensuring the strength of first housing 2.

Figure 5:
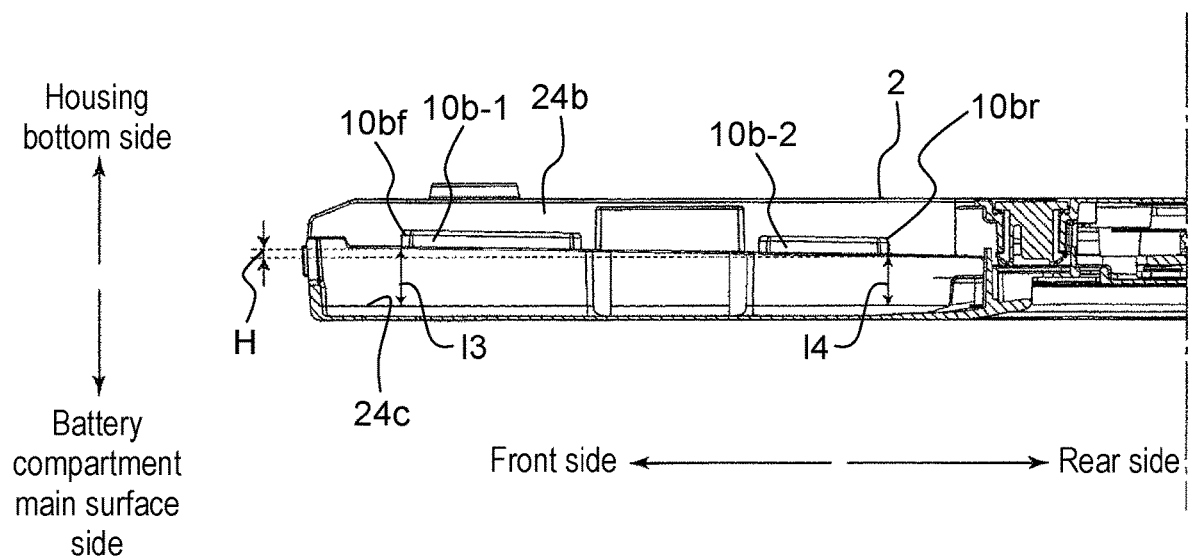
FIG. 5 is a vertical cross-sectional view of the battery compartment taken along line B-B of FIG. 2.
Figure 6:
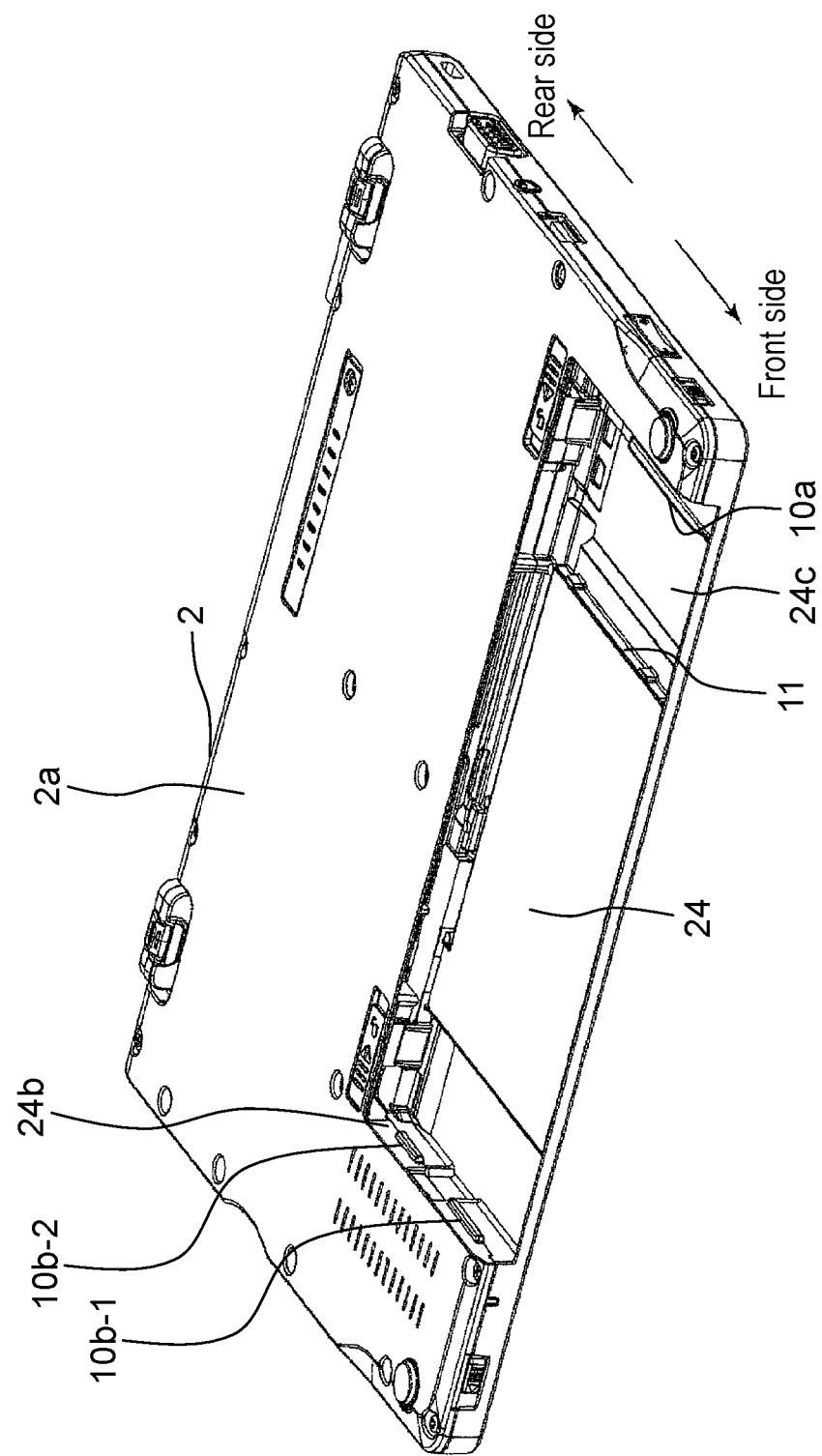
FIG. 6 is a perspective view of the personal computer of FIG. 1 (without a battery).

FIG. 5 is a vertical cross-sectional view of battery compartment 24 taken along line B-B of FIG. 2. FIG. 6 is a perspective view of personal computer 1 of FIG. 1 without battery 23 when viewed from bottom surface 2a. As illustrated in FIGS. 5 and 6, guide rails 10b-1 and 10b-2 are inclined with respect to main surface 24c of battery compartment 24 and function as in guide rail 10a. Guide rails 10b-1 and 10b-2 are formed by forming a guide rail, which is similar to guide rail 10a, on side surface 24b of battery compartment 24 opposite to side surface 24a having guide rail 10a, and cutting away a part of the guide rail to divide the guide rail into two parts. Guide rails 10b-1 and 10b-2 are inclined with respect to main surface 24c of battery compartment 24 such that distance 13 between front end 10bf of guide rail 10b-1 (the first end of the guide rail at the primary end of first housing 2) and main surface 24c of battery compartment 24 is greater than distance 14 between rear end 10br of guide rail 10b-2 (the second end of the guide rail at the opposite end of the primary end of first housing 2) and main surface 24c of battery compartment 24. In detail, front end 10bf of guide rail 10b-1 in the direction of the insertion of battery 23 is at a higher position than rear end 10br of guide rail 10b-2 in the direction of the insertion of battery 23 by H with respect to main surface 24c of battery compartment 24. H is approximately 1 mm, for example.

The above exemplary embodiment includes one guide rail 10a on side surface 24a of battery compartment 24 and two guide rails 10b-1 and 10b-2 on side surface 24b of battery compartment 24, however, the present disclosure may have any other combination of guide rails. For example, guide rails 10b-1 and 10b-2 may be replaced with a single guide rail like guide rail 10a, or three or more guide rails. Guide rail 10a may be replaced with two guide rails like guide rails 10b-1 and 10b-2, or three or more guide rails.

[1-2-2. Battery Guide Mechanism of Battery]

Figure 7:
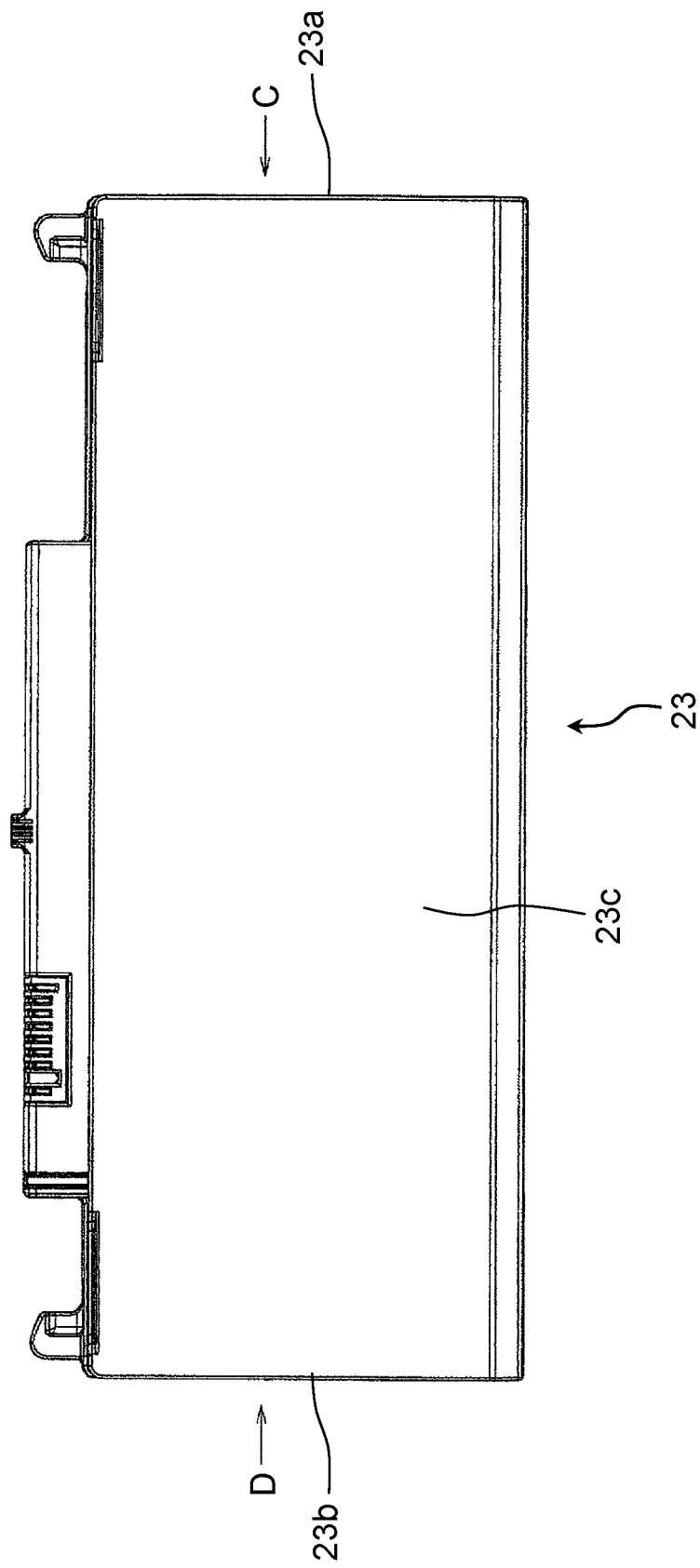
FIG. 7 is a plan view of the battery of FIG. 1.
Figure 8:
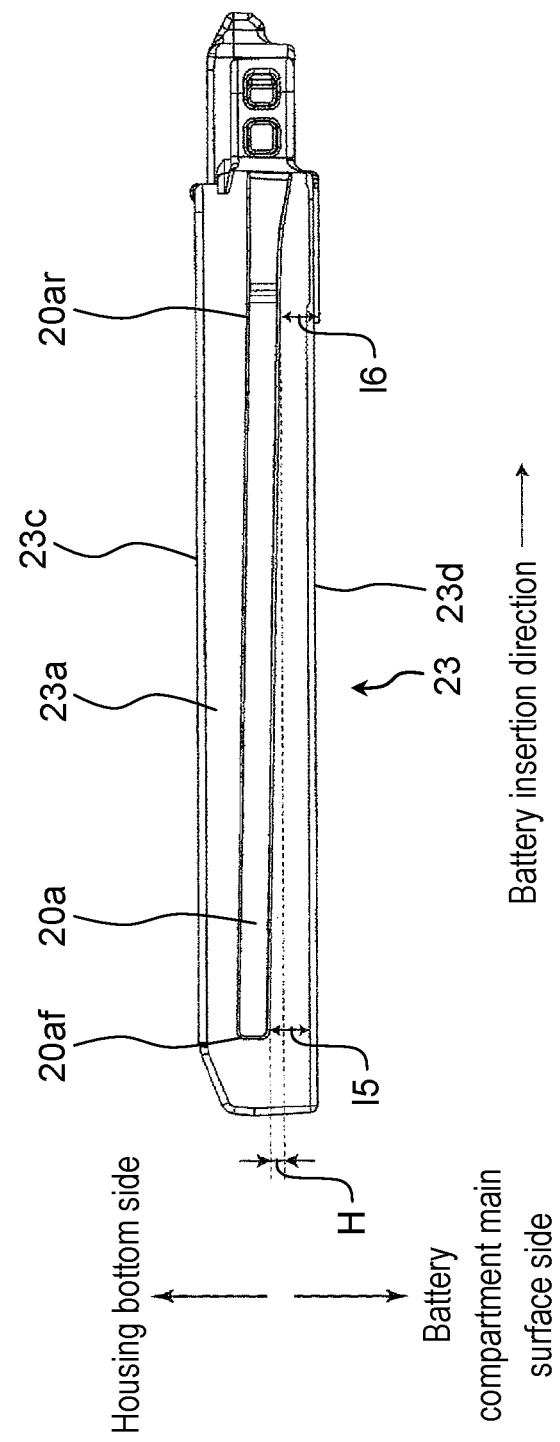
FIG. 8 is a side view of the battery of FIG. 7 when viewed from C.
Figure 9:
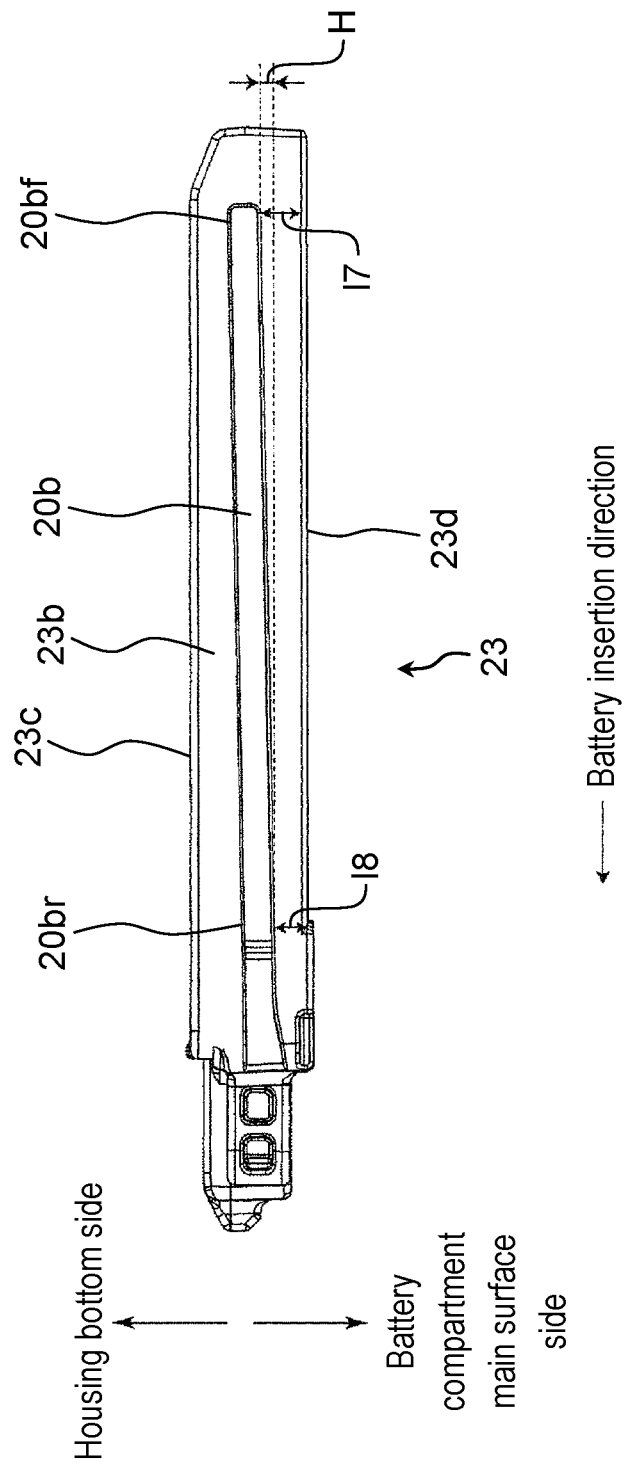
FIG. 9 is a side view of the battery of FIG. 7 when viewed from D.

FIG. 7 is a plan view of battery 23 when viewed from top surface 23c. FIG. 8 is a side view of battery 23 of FIG. 7 when viewed from C. FIG. 9 is a side view of battery 23 of FIG. 7 when viewed from D. As illustrated in FIGS. 8 and 9, battery 23 is a rectangular parallelepiped having top surface 23c, bottom surface (main surface) 23d opposite to top surface 23c, and a pair of side surfaces 23a and 23b perpendicular to bottom surface 23d. Battery 23 has printed information such as the manufacturer's name and serial number of battery 23 on bottom surface 23d. Side surface 23a of battery 23 has guide groove 20a for engaging with guide rail 10a of battery compartment 24 described above, and side surface 23b of battery 23 has guide groove 20b for engaging with guide rails 10b-1 and 10b-2 of battery compartment 24.

Guide grooves 20a and 20b are groove parts extending in the direction of the insertion of battery 23. Guide grooves 20a and 20b are inclined with respect to bottom surface 23d of battery 23. Guide groove 20a is inclined with respect to bottom surface 23d of battery 23 such that distance 15 between front end 20af of guide groove 20a (the first end of the guide groove at the primary end of first housing 2) and bottom surface (main surface) 23d of battery 23 is greater than distance 16 between rear end 20ar of guide groove 20a (the second end of the guide groove at the opposite end of the primary end of first housing 2) and bottom surface 23d of battery 23. Guide groove 20b is inclined with respect to bottom surface 23d of battery 23 such that distance 17 between front end 20bf of guide groove 20b (the first end of the guide groove at the primary end of first housing 2) and bottom surface (main surface) 23d of battery 23 is greater than distance 18 between rear end 20br of guide groove 20b (the second end of the guide groove at the opposite end of the primary end of first housing 2) and bottom surface 23d of battery 23. The inclination angle of guide grooves 20a and 20b is equal to the inclination angle of guide rail 10a and guide rails 10b-1 and 10b-2. In detail, front end 20af of guide groove 20a in the direction of the insertion of battery 23 is at a higher position than rear end 20ar of guide groove 20a in the direction of the insertion of battery 23 by H with respect to bottom surface 23d of battery 23, and front end 20bf of guide groove 20b in the direction of the insertion of battery 23 is at a higher position than rear end 20br of guide groove 20b in the direction of the insertion of battery 23 by H with respect to bottom surface 23d of battery 23. H is approximately 1 mm, for example. Guide groove 20a may have a greater width at front end 20af corresponding to the front end of first housing 2 than at rear end 20ar corresponding to the rear end of first housing 2. Guide groove 20b may have a greater width at front end 20bf corresponding to the front end of first housing 2 than at rear end 20br corresponding to the rear end of first housing 2.

[2. Function]

In personal computer 1 having the above configuration, the battery guide mechanisms function as follows.

Figure 10A:
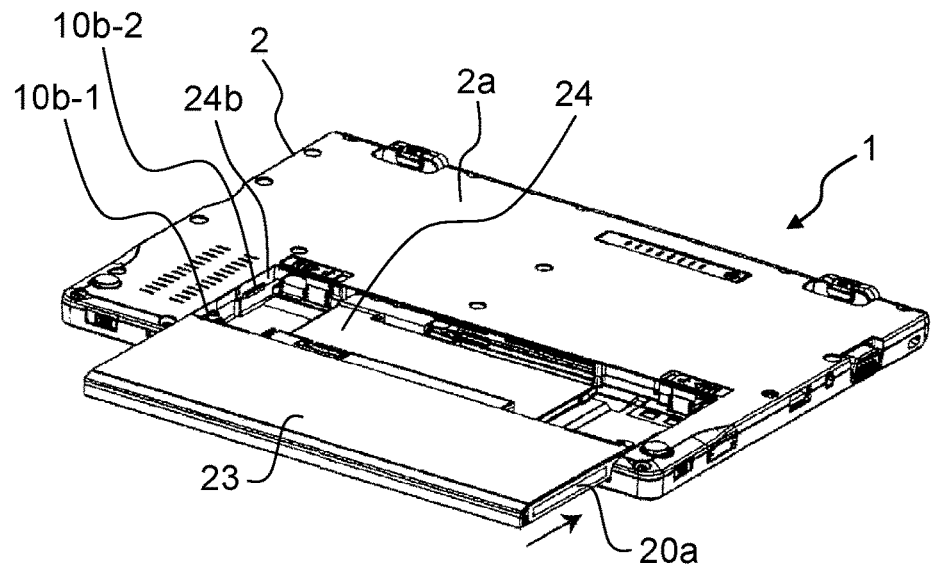
FIG. 10A is a perspective view for explaining the process of inserting the battery into the battery compartment of the personal computer of FIG. 1.
Figure 10B:
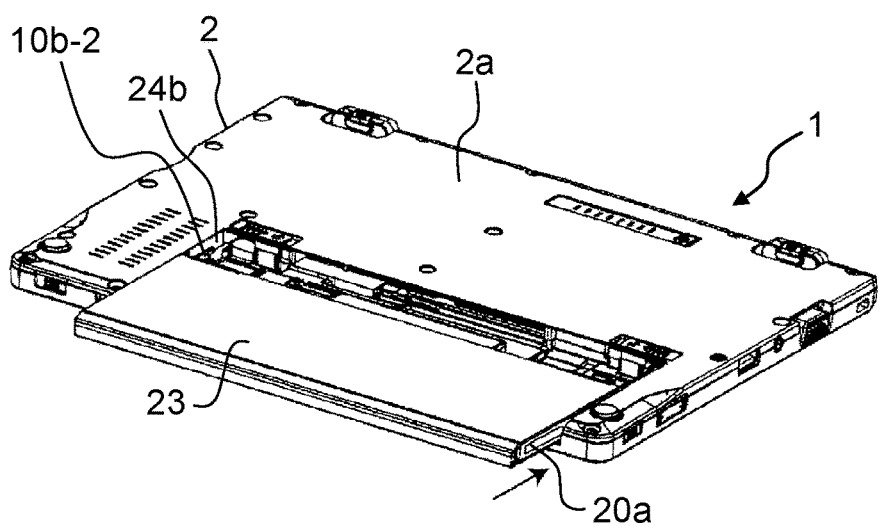
FIG. 10B is a perspective view for explaining the process of inserting the battery into the battery compartment of the personal computer of FIG. 1.
Figure 10C:
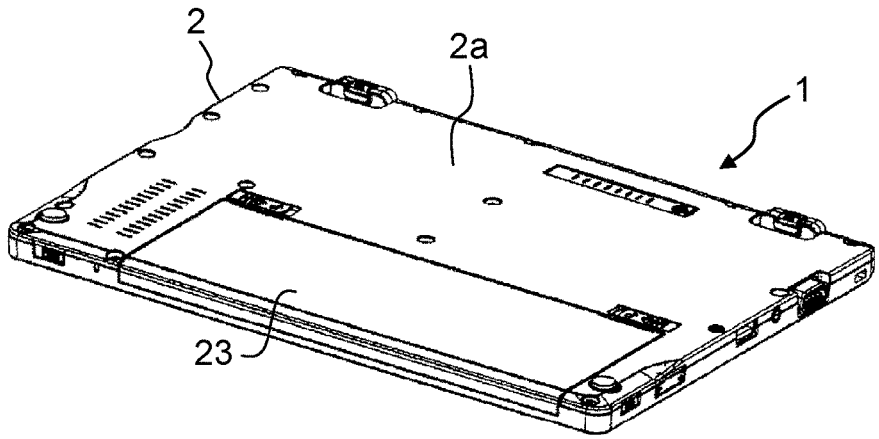
FIG. 10C is a perspective view for explaining the process of inserting the battery into the battery compartment of the personal computer of FIG. 1.
Figure 11A:
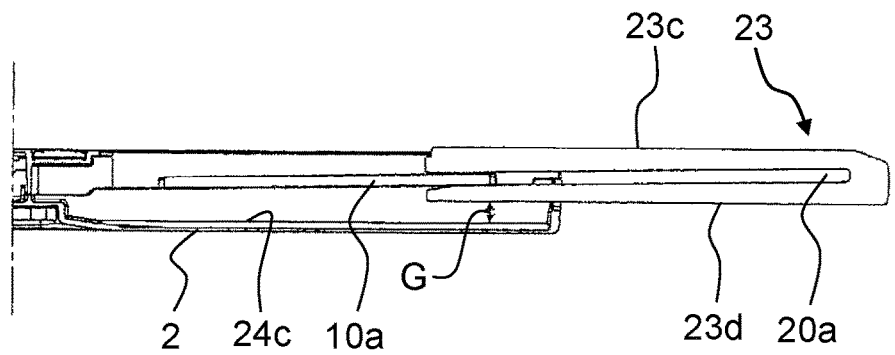
FIG. 11A is a side view for explaining the process of inserting the battery into the battery compartment of the personal computer of FIG. 1.
Figure 11B:
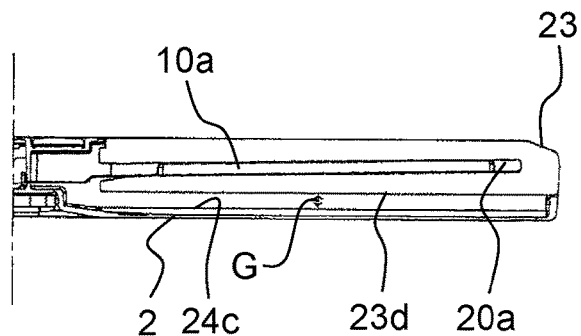
FIG. 11B is a side view for explaining the process of inserting the battery into the battery compartment of the personal computer of FIG. 1.

FIGS. 10A to 10C are perspective views for explaining the process of inserting battery 23 into battery compartment 24 of personal computer 1. FIGS. 11A and 11B are side views for explaining the process of inserting battery 23 into battery compartment 24 of personal computer 1.

As illustrated in FIGS. 10A to 10C and FIGS. 11A and 11B, in order to insert battery 23 into battery compartment 24, guide groove 20a and guide groove 20b (see FIG. 9) are first engaged with guide rail 10a and guide rail 10b-1, respectively (see FIGS. 10A and 11A). Battery 23 is then pushed into battery compartment 24, thereby inserting battery 23 into battery compartment 24. When battery 23 is pushed inside for a predetermined distance (see FIG. 10B), guide groove 20b next engages with guide rail 10b-2.

Battery 23 is then pushed further until battery 23 is completely inserted into battery compartment 24 for installation (see FIGS. 10C and 11B).

In the present exemplary embodiment, as illustrated in FIGS. 3 and 5, guide rail 10a and guide rails 10b-1 and 10b-2 are inclined with respect to main surface 24c of battery compartment 24 such that distance 11 between front end 10af of guide rail 10a and main surface 24c of battery compartment 24 is greater than distance 12 between rear end 10ar of guide rail 10a and main surface 24c, and distance 13 between front end 10bf of guide rail 10b-1 and main surface 24c is greater than distance 14 between rear end 10br of guide rail 10b-2 and main surface 24c. Gap G between main surface 24c of battery compartment 24 and battery 23 is thus the widest at the beginning of the insertion of battery 23 into battery compartment 24 (see FIG. 11A). As battery 23 is slid into battery compartment 24, gap G becomes narrower linearly (see FIG. 11B). This prevents battery 23 from coming into contact with first housing 2 when battery 23 is inserted into battery compartment 24.

This prevents damage to bottom surface (main surface) 23d of battery 23, which is configured to face battery compartment 24. Accordingly, the printed information such as the manufacturer's name and serial number of battery 23 on bottom surface 23d of battery 23, which is configured to face battery compartment 24 can be protected from being erased. This structure eliminates the necessity for widening the gap between battery 23 and battery compartment 24 to ensure enough gap between battery 23 and battery compartment 24 at the beginning of battery insertion. Personal computer 1 thus does not need to be thicker, which does not increase the weight of personal computer 1. In addition, since battery 23 hardly comes into contact with battery compartment 24 during the insertion of battery 23 into battery compartment 24, a reinforcing member such as a reinforcing rib can be disposed on a battery surface of battery compartment 24 for sufficiently ensuring the strength of first housing 2 of personal computer 1.

In order to remove battery 23 from battery compartment 24, battery 23 should be moved in the opposite direction to the direction of the insertion of battery 23 into battery compartment 24. At the beginning of the removal, battery 23 is pulled toward a user. As battery 23 is slid further, gap G is becomes wider linearly.

[3. Advantageous Effects]

As described above, personal computer 1 of the present exemplary embodiment includes battery 23 and first housing 2 having battery compartment 24 for battery 23. Battery 23 has bottom surface (main surface) 23d and a pair of side surfaces 23a and 23b perpendicular to bottom surface 23d. Battery compartment 24 is a recess in bottom surface (main surface) 2a of first housing 2. The recess is formed by cutting away the area including the primary end of first housing 2. Battery compartment 24 has main surface 24c and a pair of side surfaces 24a and 24b. Main surface 24c and side surfaces 24a and 24b of battery compartment 24 are configured to face bottom surface 23d and side surfaces 23a and 23b of battery 23, respectively, when battery 23 is placed in battery compartment 24. Side surface 24a has guide rail 10a for guiding battery 23 into battery compartment 24, and side surface 24b has guide rails 10b-1 and 10b-2 for guiding battery 23 into battery compartment 24. Side surface 23a has guide groove 20a for engaging with guide rail 10a, and side surface 23b has guide groove 20b for engaging with guide rails 10b-1 and 10b-2.

Guide rail 10a has first end 10af at the primary end of first housing 2 and second end 10ar at the opposite end of the primary end of first housing 2. Guide rails 10b-1 and 10b-2 have first end 10bf at the primary end of first housing 2 and second end 10br at the opposite end of the primary end of first housing 2. Guide rail 10a and guide rails 10b-1 and 10b-2 are inclined with respect to main surface 24c of battery compartment 24 from first ends 10af and 10bf to second ends 10ar and 10br. Distance 11 between first end 10af of guide rail 10a and main surface 24c of battery compartment 24 is greater than distance 12 between second end 10ar of guide rail 10a and main surface 24c, and distance 13 between first end 10bf of guide rail 10b-1 and main surface 24c is greater than distance 14 between second end 10br of guide rail 10b-2 and main surface 24c.

In this structure, in the direction of battery insertion, guide rail 10a and guide rails 10b-1 and 10b-2 are inclined with respect to main surface 24c of battery compartment 24 such that the distance between guide rail 10a and main surface 24c decreases from the front end of guide rail 10a (the first end of the guide rail at the primary end of the housing) toward the rear end of guide rail 10a (the second end of the guide rail at the opposite end of the primary end of the housing), and the distance between guide rails 10b-1 and 10b-2 and main surface 24c decreases from the front end of guide rail 10b-1 (the first end of the guide rail at the primary end of the housing) toward the rear end of guide rail 10b-2 (the second end of the guide rail at the opposite end of the primary end of the housing). When battery 23 is inserted into battery compartment 24, this structure allows battery 23 to keep a certain distance from battery compartment 24 at the beginning of the insertion, which prevents battery 23 from coming into contact with first housing 2 during the insertion of battery 23 into battery compartment 24. This prevents damage to bottom surface (main surface) 23d of battery 23, which is configured to face battery compartment 24. Accordingly, the printed information such as the manufacturer's name and serial number of battery 23 on bottom surface 23d of battery 23, which is configured to face battery compartment 24 can be protected from being erased.

This structure eliminates the necessity for widening the gap between battery 23 and battery compartment 24 to ensure enough gap between battery 23 and battery compartment 24 at the beginning of battery insertion. Personal computer 1 thus does not need to be thicker, which does not increase the weight of personal computer 1.

In addition, since battery 23 hardly comes into contact with battery compartment 24 during the insertion of battery 23 into battery compartment 24, a reinforcing member such as a reinforcing rib can be disposed on a battery surface of battery compartment 24 for sufficiently ensuring the strength of first housing 2 of personal computer 1.

In personal computer 1 of the present exemplary embodiment, guide groove 20a has first end 20af corresponding to the primary end of first housing 2 and second end 20ar corresponding to the opposite end of the primary end of first housing 2, and guide groove 20b has first end 20bf corresponding to the primary end of first housing 2 and second end 20br corresponding to the opposite end of the primary end of first housing 2. Guide grooves 20a and 20b are inclined with respect to bottom surface (main surface) 23d of battery 23 from first ends 20af and 20bf to second ends 20ar and 20br. In guide groove 20a, distance 15 between first end 20af and bottom surface 23d is greater than distance 16 between second end 20ar and bottom surface 23d. In guide groove 20b, distance 17 between first end 20bf and bottom surface 23d is greater than distance 18 between second end 20br and bottom surface 23d. The inclination angle of guide rail 10a and guide rails 10b-1 and 10b-2 is equal to the inclination angle of guide grooves 20a and 20b.

Since the inclination angle of guide rail 10a and guide rails 10b-1 and 10b-2 is equal to the inclination angle of guide grooves 20a and 20b, this structure keeps bottom surface 23d of battery 23 substantially parallel to main surface 24c of battery compartment 24. Battery 23 thus can keep a substantially equal distance from main surface 24c of battery compartment 24 along all the length in the direction of insertion.

In personal computer 1 of the present exemplary embodiment, guide groove 20a has a greater width at first end 20af than at second end 20ar, and guide groove 20b has a greater width at first end 20bf than at second end 20br.

This structure allows guide grooves 20a and 20b to be easily engaged with guide rail 10a and guide rails 10b-1 and 10b-2, respectively, when battery 23 is inserted into battery compartment 24. Battery 23 can thus more smoothly be slid, for installation, into battery compartment 24 along guide rail 10a and guide rails 10b-1 and 10b-2.

Modification

In the above exemplary embodiment, the guide rails are disposed on the housing and the guide grooves are formed in the battery. Alternatively, the housing may have a guide groove instead of a guide rail, and the battery may have a guide rail instead of a guide groove. This modified exemplary embodiment also provides advantageous effects similar to the above exemplary embodiment.

In the modified exemplary embodiment, personal computer 1 includes battery 23 and first housing 2 having battery compartment 24 for battery 23. Battery 23 has bottom surface (main surface) 23d and a pair of side surfaces 23a and 23b perpendicular to bottom surface 23d. Battery compartment 24 is a recess in bottom surface (main surface) 2a of first housing 2. The recess is formed by cutting away the area including a primary end of first housing 2. Battery compartment 24 has main surface 24c and a pair of side surfaces 24a and 24b. Main surface 24c and side surfaces 24a and 24b of battery compartment 24 are configured to face bottom surface 23d and side surfaces 23a and 23b of battery 23, respectively, when battery 23 is placed in battery compartment 24. Side surfaces 24a and 24b of battery compartment 24 have guide grooves for guiding battery 23 into battery compartment 24, and side surfaces 23a and 23b of battery 23 have guide rails for engaging with the respective guide grooves. Each of the guide grooves has a first end at the primary end of the housing and a second end at the opposite end of the primary end of the housing. Each of the guide rails is inclined with respect to the main surface of the battery compartment from the first end to the second end such that the distance between the first end of the guide groove and the main surface of the battery compartment is greater than the distance between the second end of the guide groove and the main surface of the battery compartment.

In personal computer 1 of the modified exemplary embodiment, each of the guide rails has a first end at the primary end of the housing and a second end at the opposite end of the primary end of the housing. Each of the guide rails is inclined with respect to bottom surface 23d of the battery from the first end to the second end such that the distance between the first end of the guide rail and the main surface of the battery is greater than the distance between the second end of the guide rail and the main surface of the battery. The inclination angle of the guide rails is equal to the inclination angle of the guide grooves.

In personal computer 1 of the modified exemplary embodiment, each of the guide grooves has a greater width at the first end than at the second end.

Other Exemplary Embodiments

In the above description, the present disclosure describes first exemplary embodiment and its modification as examples of the techniques disclosed in the present application. The present disclosure includes any technique other than these exemplary embodiments. The present disclosure can be applied to other exemplary embodiment by appropriate modification, replacement, addition, and elimination of structural elements. For example, other exemplary embodiment can be provided by combining the structural elements of first exemplary embodiment.

In the above exemplary embodiments, personal computer 1 is took as an example of an electronic device, however, the present disclosure is not limited to this application. The present disclosure can be applied to a wide range of electronic devices such as a tablet-type device, a mobile phone, a movie camera, a mobile TV, and a portable Blu-ray Disc player. In the above exemplary embodiments, the guide mechanisms for a battery are described, however, the present disclosure is not limited to this application. The guide mechanisms according to the above exemplary embodiments can be applied to other recording media such as a hard disk drive (HDD) or a solid state drive (SSD) that can be slid into or out of an electronic device.

It should be noted that the above exemplary embodiments are merely examples of the techniques covered by the present disclosure. In addition, the accompanying drawings and the detailed description are provided for the purpose of clarifying the explanation of the exemplary embodiments.

To clarify the explanation, the accompanying drawings and the detailed description may include not only indispensable structural elements of the exemplary embodiments but also structural elements that are not necessarily indispensable. These not necessarily indispensable structural elements should not be considered to be indispensable only because these elements are in the accompanying drawings or the detailed description.

The above exemplary embodiments are merely examples of the techniques covered by the present disclosure and can be subject to appropriate modification, replacement, addition, and elimination of structural elements within the scope of claims and the equivalent scope.

The present disclosure can be applied to any electronic device using a removable battery that can be slid into the electronic device. In detail, the present disclosure can be applied to a tablet-type device, a mobile phone, a movie camera, a mobile TV, and a portable Blu-ray Disc player.

What is claimed is:

1. An electronic device comprising:
   a battery; and
   a housing including a battery compartment for the battery,
   wherein the housing includes a keyboard,
   wherein the battery has a main surface and a pair of side surfaces perpendicular to the main surface,
   wherein the battery compartment is a recess in a main surface of the housing that extends to a primary end of the housing,
   wherein the battery compartment has a main surface and a pair of side surfaces and a shape in plan view corresponding to a shape in plan view of the battery, the main surface of the battery compartment being configured to face the main surface of the battery and the side surfaces of the battery compartment being configured to face the respective side surfaces of the battery when the battery is disposed in the battery compartment,
   wherein each of the side surfaces of the battery compartment has a guide rail for guiding the battery into the battery compartment,
   wherein each of the side surfaces of the battery has a guide groove for engaging with a corresponding guide rail of the battery compartment, and
   wherein each of the guide rails has a first end at the primary end of the housing and a second end at an opposite end of the primary end of the housing and a uniform width from the first end to the second end, each of the guide rails being linearly inclined with respect to the main surface of the battery compartment from the first end to the second end such that a distance between the first end of the guide rail and the main surface of the battery compartment is greater than a distance between the second end of the guide rail and the main surface of the battery compartment.

2. The electronic device according to claim 1,
   wherein each of the guide grooves has a first end at the primary end of the housing and a second end at the opposite end of the primary end of the housing, each of the guide grooves being inclined with respect to the main surface of the battery from the first end of the guide groove to the second end of the guide groove such that a distance between the first end of the guide groove and the main surface of the battery is greater than a distance between the second end of the guide groove and the main surface of the battery, and
   wherein an inclination angle of the guide rails is equal to an inclination angle of the guide grooves.

3. The electronic device according to claim 2, wherein each of the guide grooves has a greater width at the first end than at the second end.

4. An electronic device comprising:
   a battery; and
   a housing including a battery compartment for the battery,
   wherein the housing includes a keyboard,
   wherein the battery has a main surface and a pair of side surfaces perpendicular to the main surface,
   wherein the battery compartment is a recess in a main surface of the housing that extends to a primary end of the housing,
   wherein the battery compartment has a main surface and a pair of side surfaces and a shape in plan view corresponding to a shape in plan view of the battery, the main surface of the battery compartment being configured to face the main surface of the battery and the side surfaces of the battery compartment being configured to face the respective side surfaces of the battery when the battery is disposed in the battery compartment,
   wherein each of the side surfaces of the battery compartment has a guide groove for guiding the battery into the battery compartment,
   wherein each of the side surfaces of the battery has a guide rail for engaging with a corresponding guide groove of the battery compartment, and
   wherein each of the guide grooves has a first end at the primary end of the housing and a second end at an opposite end of the primary end of the housing, each of the guide grooves being inclined with respect to the main surface of the battery compartment from the first end to the second end such that a distance between the first end of the guide groove and the main surface of the battery compartment is greater than a distance between the second end of the guide groove and the main surface of the battery compartment.

5. The electronic device according to claim 4,
   wherein each of the guide rails has a first end at the primary end of the housing and a second end at the opposite end of the primary end of the housing, each of the guide rails being inclined with respect to the main surface of the battery from the first end of the guide rail to the second end of the guide rail such that a distance between the first end of the guide rail and the main surface of the battery is greater than a distance between the second end of the guide rail and the main surface of the battery, and
   wherein an inclination angle of the guide rails is equal to an inclination angle of the guide grooves.

6. The electronic device according to claim 4, wherein each of the guide grooves has a greater width at the first end than at the second end.

7. The electronic device according to claim 1, configured such that, when the battery is being inserted into the battery compartment, a clearance between the battery and the main surface of the battery compartment is greater at the first end of the guide rail than at the second end of the guide rail.

* * * * *